US008214902B2

(12) United States Patent
Khosravi et al.

(10) Patent No.: US 8,214,902 B2
(45) Date of Patent: Jul. 3, 2012

(54) DETERMINATION BY CIRCUITRY OF PRESENCE OF AUTHORIZED AND/OR MALICIOUS DATA

(75) Inventors: Hormuzd M. Khosravi, Portland, OR (US); Vincent E. Von Bokern, Rescue, CA (US); Men Long, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 419 days.

(21) Appl. No.: 12/487,878

(22) Filed: Jun. 19, 2009

(65) Prior Publication Data
US 2010/0325729 A1 Dec. 23, 2010

(51) Int. Cl.
G06F 12/14 (2006.01)
G06F 11/30 (2006.01)
H04L 29/06 (2006.01)
H04L 9/32 (2006.01)
H03K 19/003 (2006.01)

(52) U.S. Cl. ............ 726/24; 726/33; 713/165; 713/176; 713/187; 713/188; 713/189; 326/12

(58) Field of Classification Search ............ 726/24, 726/23; 713/165, 176, 187, 188, 189; 326/12
See application file for complete search history.

(56) References Cited

U.S. PATENT DOCUMENTS

| 5,345,252 | A | * | 9/1994 | Hannah | 345/162 |
|---|---|---|---|---|---|
| 5,504,416 | A | * | 4/1996 | Holloway et al. | 320/152 |
| 5,717,394 | A | * | 2/1998 | Schwartz et al. | 341/51 |
| 5,901,327 | A | | 5/1999 | Ofek | |
| 5,987,506 | A | | 11/1999 | Carter et al. | |
| 6,134,603 | A | | 10/2000 | Jones et al. | |
| 6,226,746 | B1 | | 5/2001 | Scheifler | |
| 6,434,681 | B1 | | 8/2002 | Armangau | |
| 6,487,607 | B1 | | 11/2002 | Wollrath et al. | |
| 7,389,539 | B1 | * | 6/2008 | Kouznetsov | 726/22 |
| 7,392,489 | B1 | * | 6/2008 | Jackson et al. | 716/102 |
| 7,613,858 | B1 | * | 11/2009 | Jackson et al. | 710/104 |
| 7,882,318 | B2 | | 2/2011 | Savagaonkar et al. | |
| 2004/0107345 | A1 | * | 6/2004 | Brandt et al. | 713/171 |
| 2009/0132839 | A1 | * | 5/2009 | Rothman et al. | 713/320 |
| 2009/0249260 | A1 | * | 10/2009 | Wakabayashi | 716/1 |
| 2010/0250797 | A1 | | 9/2010 | Khosravi et al. | |

(Continued)

OTHER PUBLICATIONS

"McAfee®—enterprise—McAfee Architecture", McAfee®, Integrated data for integrated responses, Retrieved on Jun. 30, 2009, 4 pages, Available at:- http://www.mcafee.com/us/enterprise/products/architecture/index.html.

(Continued)

*Primary Examiner* — Aravind Moorthy
(74) *Attorney, Agent, or Firm* — Christopher K. Gagne

(57) ABSTRACT

An embodiment may include circuitry that may be comprised in a host. The host may include memory and a host processor to execute an operating system. The circuitry may be to determine, independently of the operating system and the host processor, the authenticity of signature list information, based at least in part upon authentication information received by the circuitry from a remote server. The circuitry also may be to determine, independently of the operating system and the host processor, based at least in part upon comparison of at least one portion of the signature list information with at least one portion of contents of the memory, whether authorized and/or malicious data are present in the at least one portion of the contents of the memory. Of course, many variations, modifications, and alternatives are possible without departing from this embodiment.

20 Claims, 7 Drawing Sheets

U.S. PATENT DOCUMENTS

| | | |
|---|---|---|
| 2010/0306177 A1 | 12/2010 | Khosravi et al. |
| 2010/0332744 A1 | 12/2010 | Khosravi et al. |
| 2011/0125960 A1* | 5/2011 | Casselman .................. 711/104 |

OTHER PUBLICATIONS

"Symantec AntiVirus(TM) Corporate Edition: Automated defense and response against the latest viruses, spyware, and adware", Data Sheet: Virus Protection and Endpoint Security, symantec Corporation, Copyright 2009, pp. 1-4.

"Symantec(TM) Scan Engine: Fast, scalable, and reliable content scanning services and API for protection against viruses and other unwanted content", Data Sheet: Messaging Security: Content Filtering, symantec(TM), Copyright 2008, pp. 1-2.

"McAfee Enterprise Security Suite Solutions: Proactive enterprise threat protection", McAfee® Proven Security Corporation, Copyright 2006, 4 pages.

U.S. Appl. No. 12/475,216 titled "Host Operating System Independent Storage-Related Remote Access and Operations" filed May 29, 2009, 28 pages.

U.S. Appl. No. 12/492,964 titled "Data Recovery and Overwrite Independent of Operating System" filed Jun. 26, 2009, 25 pages.

Gudgin, M. et al., "SOAP Version 1.2 Part 1: Messaging Framework (Second Edition)", W3C Recommendation, Apr. 27, 2007, Available at:- http://www.w3.org/TR/soap12-part1/.

"Architecture Guide: Intel® Active Management Technology—Intel® Software Network," Retrieved on Apr. 28, 2009, 18 pp., Available at:- http://software.intel.com/en-us/articles/architecture-guide-intel-active-management-technology/.

Masiewicz, J., "T13 1532D vol. 1, Information Technology—AT Attachment with Packet Interface—7, vol. 1—Register Delivered Command Set, Logical Register Set (ATA/ATAPI-7 V1)", Working Draft American National Project Standard, Mar. 31, 2004, 393 pages.

"External Serial ATA ", White Paper—Silicon Image, Sep. 2004, pp. 1-16.

"Intel® Active Management Technology Overview", Release 4.0.3, Jun. 2008, pp. 1-14.

"Intel® Active Management Technology", Retrieved on Apr. 17, 2009, 2 pages, Available at:- http://www.intel.com/technology/platform-technology/intel-amt/.

Postel, J. et al., "File Transfer Protocol (FTP)", Network Working Group, Obsoletes RFC: 765 (IEN 149), Oct. 1985, pp. 1-69.

Chadalapaka, M. "Internet Small Computer System Interface (iSCSI) Corrections and Clarifications", Network Working Group, Category: Standards Track, Oct. 2007, pp. 1-38.

Dierks, T. "The Transport Layer Security (TLS) Protocol Version 1.2", Network Working Group, Category: Standards Track, Aug. 2008, pp. 1-104.

"U.S. Appl. No. 12/415,612, Platform Based Verification of Contents of Input-Output Devices, filed Mar. 31, 2009", 18 pages.

Non Final Office Action received for U.S. Appl. No. 12/475,216 mailed on Aug. 12, 2011, 22 pages.

* cited by examiner

DETERMINATION BY CIRCUITRY OF PRESENCE OF AUTHORIZED AND/OR MALICIOUS DATA

FIELD

This disclosure relates to determination by circuitry of presence of authorized and/or malicious data.

BACKGROUND

In one conventional arrangement, a host processor in a client executes an operating system. The operating system stores data at the client. Software agents executed by, in association with, and/or as part of the operating system in the client implement malicious program (e.g., virus) detection/repair utilities with respect to the data stored at the client. Unfortunately, in this conventional arrangement, as a result of the agents being software processes that rely upon the operating system, the agents themselves and their operations may be relatively easily tampered with by the malicious programs. Such tampering may render the software agents inoperative and/or may result the co-opting of the agents' functions for use by the malicious programs. Also, these operating system agents do not provide these utilities unless the host processor in the client is executing the operating system agents in a powered-on state. Unfortunately, this may result in the client consuming an undesirably large amount of power to provide these utilities. Also, since the agents are executed by the host processor, an undesirably large amount of the host processor's processing bandwidth, as well as, an undesirably large amount of processing time may be consumed to provide these utilities. This is especially true given the increasing number of malicious programs coming into existence, and as a result, the increasing number of data patterns to be examined by the agents in order to determine whether such malicious programs are present. Additionally, if the operating system or agents have not been properly installed, the utilities may not function properly, if at all.

BRIEF DESCRIPTION OF THE SEVERAL VIEWS OF THE DRAWINGS

Features and advantages of embodiments will become apparent as the following Detailed Description proceeds, and upon reference to the Drawings, wherein like numerals depict like parts, and in which.

Although the following Detailed Description will proceed with reference being made to illustrative embodiments, many alternatives, modifications, and variations thereof will be apparent to those skilled in the art. Accordingly, it is intended that the claimed subject matter be viewed broadly.

DETAILED DESCRIPTION

Figure 1:
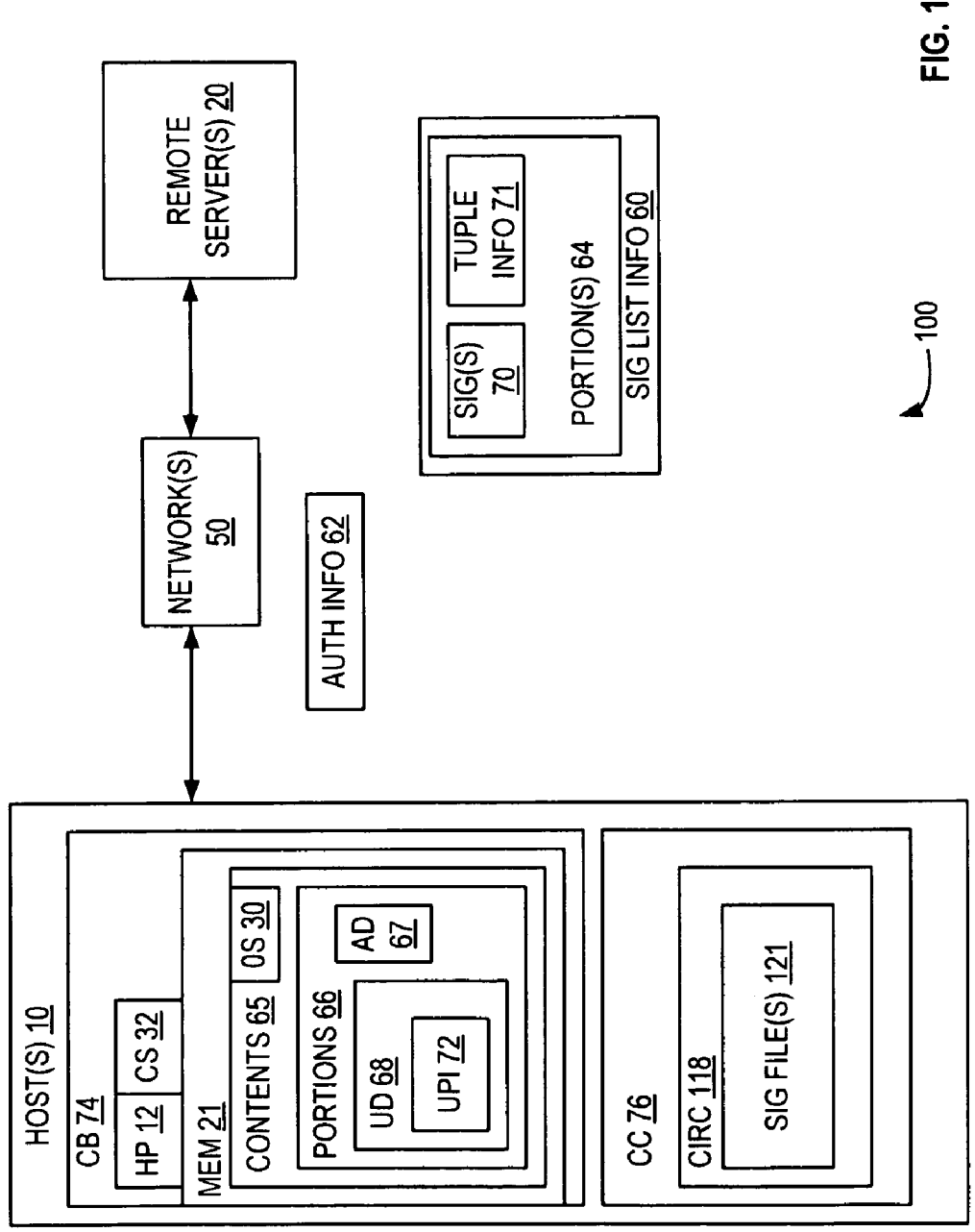
FIG. 1 illustrates a system embodiment.

FIG. 1 illustrates a system embodiment 100. System 100 may include one or more hosts 10 and one or more remote servers 20 that may be communicatively coupled together via one or more wireless and/or wired networks 50. In this embodiment, the terms "host node," "host," "server," and "node" may be used interchangeably, and may mean, for example, one or more end stations, appliances, intermediate stations, network interfaces, clients, servers, and/or portions thereof. In this embodiment, a "network" may be or comprise any mechanism, instrumentality, modality, and/or portion thereof that permits, facilitates, and/or allows, at least in part, two or more entities to be communicatively coupled together. Also in this embodiment, a first entity may be "communicatively coupled" to a second entity if the first entity is capable of transmitting to and/or receiving from the second entity one or more commands and/or data. In this embodiment, data may be or comprise one or more commands (such as for example one or more program instructions), and/or one or more such commands may be or comprise data.

One or more hosts 10 may comprise circuit board (CB) 74 and circuit card (CC) 76. In this embodiment, CB 74 may comprise, for example, a system motherboard and may be physically and communicatively coupled to CC 76 via a not shown bus connector/slot system. CB 74 may comprise one or more host processors (HP) 12, computer-readable/writable memory 21, and one or more chipsets (CS) 32. One or more HP 12 may be communicatively coupled via one or more CS 32 to memory 21 and CC 76. CC 76 may comprise operative circuitry 118.

Although not shown in the Figures, some or all of circuitry 118 and/or the functionality and components thereof may be comprised in, for example, one or more HP 12 and/or in one or more CS 32. For example, in this arrangement, the CC 76 that comprises circuitry 118 may be eliminated (in whole or in part), and circuitry 118 may be comprised in a manageability engine (ME) co-processor and/or virtualization engine (VE) co-processor in one or more CS 32. Alternatively, one or more HP 12, memory 21, one or more CS 32, and/or some or all of the functionality and/or components thereof may be comprised in, for example, circuitry 118 and/or CB 76. In this embodiment, circuitry 118, one or more CS 32, and/or one or more servers, as well as the communications and interactions between one or more nodes 10 and one or more nodes 20, generally may be in accordance and/or compatible with Intel® Active Management Technology (AMT). One or more hosts 10 may be or comprise one or more Intel® AMT clients. One or more nodes 20 may be or comprise one or more Intel® AMT remote management servers. Communications between one or more nodes 10 and one or more nodes 20 may take place via one or more Intel® AMT out-of-band channels (not shown) via one or more networks 50.

Although not shown in the Figures, one or more remote servers 20 may comprise, in whole or in part, the components and/or functionality of one or more hosts 10. Alternatively, one or more remote servers 20 may comprise components and/or functionality other than and/or in addition to the components and/or functionality of one or more hosts 10.

Each of the one or more HP 12 may comprise, for example, a respective Intel® microprocessor commercially available from the Assignee of the subject application. Of course, alternatively, each of the HP 12 may comprise a respective microprocessor that is manufactured and/or commercially available from a source other than the Assignee of the subject application.

As used herein, "circuitry" may comprise, for example, singly or in any combination, analog circuitry, digital circuitry, hardwired circuitry, programmable circuitry, co-processor circuitry, state machine circuitry, and/or memory that may comprise program instructions that may be executed by programmable circuitry. Also, in this embodiment, a "processor," "co-processor," and a "controller" each may comprise respective circuitry capable of performing, at least in part, one or more arithmetic and/or logical operations, such as, for example, one or more respective central processing units. Also in this embodiment, a "chipset" may comprise circuitry capable of communicatively coupling, at least in part, one or more HP, storage, mass storage, one or more nodes, and/or memory. Although not shown in the Figures, one or more hosts 10 and/or one or more servers 20 each may comprise a respective graphical user interface system. Each such graphical user interface system may comprise, e.g., a respective keyboard, pointing device, and display system that may permit a human user to input commands to, and monitor the operation of, one or more hosts 10, one or more nodes 20, and/or system 100.

One or more machine-readable program instructions may be stored in computer-readable/writable memory 21 and/or circuitry 118. In operation of one or more hosts 10, these instructions may be accessed and executed by one or more HP 12, circuitry 118, one or more CS 32. When executed by one or more HP 12, circuitry 118, one or more CS 32, these one or more instructions may result in one or more HP 12, circuitry 118, one or more CS 32 performing the operations described herein as being performed by one or more HP 12, circuitry 118, one or more CS 32. In this embodiment, "memory" may comprise one or more of the following types of memories: semiconductor firmware memory, programmable memory, non-volatile memory, read only memory, electrically programmable memory, random access memory, flash memory, magnetic disk memory, optical disk memory, and/or other or later-developed computer-readable and/or writable memory.

In this embodiment, one or more hosts 10 and one or more remote server nodes 20 may be geographically remote from each other. Circuitry 118 and/or one or more CS 32 may be capable of exchanging data and/or commands via one or more networks 50 in accordance with one or more protocols. These one or more protocols may be compatible with, e.g., an Ethernet protocol, Transmission Control Protocol/Internet Protocol (TCP/IP), Simple Object Access Protocol (SOAP), and/or Transport Layer Security (TLS) protocol.

The Ethernet protocol that may be utilized in system 100 may comply or be compatible with the protocol described in Institute of Electrical and Electronics Engineers, Inc. (IEEE) Std. 802.3, 2000 Edition, published on Oct. 20, 2000. The TCP/IP that may be utilized in system 100 may comply or be compatible with the protocols described in Internet Engineering Task Force (IETF) Request For Comments (RFC) 791 and 793, published September 1981. The SOAP that may be utilized in system 100 may comply or be compatible with the protocol described in SOAP Version 1.2 Part 1: Messaging Framework (Second Edition), World Wide Web Consortium (W3C®) Recommendation, published 27 Apr. 2007 by W3C®. The TLS protocol that may be utilized in system 100 may comply or be compatible with the protocol described in IETF RFC 5246, published August 2008. Of course, many different, additional, and/or other protocols may be used for such data and/or command exchange without departing from this embodiment, including for example, later-developed versions of the aforesaid and/or other protocols.

With particular reference now being made to FIGS. 1 to 7, operations 700 (see FIG. 7) that may be performed in system 100 will be described. After, for example, a reset of one or more hosts 10, one or more processors 12 may execute one or more instructions that may result in one or more processors 12 executing one or more operating systems (OS) 30 that may become resident in memory 21. In this embodiment, one or more OS 30 may be or comprise one or more program processes.

A human user (not shown) of one or more nodes 20 may issue via the not shown graphic user interface system one or more commands to one or more remote servers 20 that may result in one or more one more remote servers 20 transmitting, via one or more networks 50, to one or more chipsets 32 and/or circuitry 118, signature list information 60 and/or authentication information 62. Alternatively or additionally, without departing from this embodiment, some or all of signature list information 60 may be provided to one or more hosts 10 via one or more other and/or additional instrumentalities (e.g., download from one or more other and/or additional secure and/or authenticated sources, manual entry, etc.). In this embodiment, "authentication" involves determination, at least in part, of an entity's identity and/or one or more properties of the entity, such as, for example, determination of a source of signature list information 60 and/or authentication information 62 and/or of whether that source is authorized (e.g., by an administrative or other authority) to provide information 60 and/or information 62.

Figure 7:
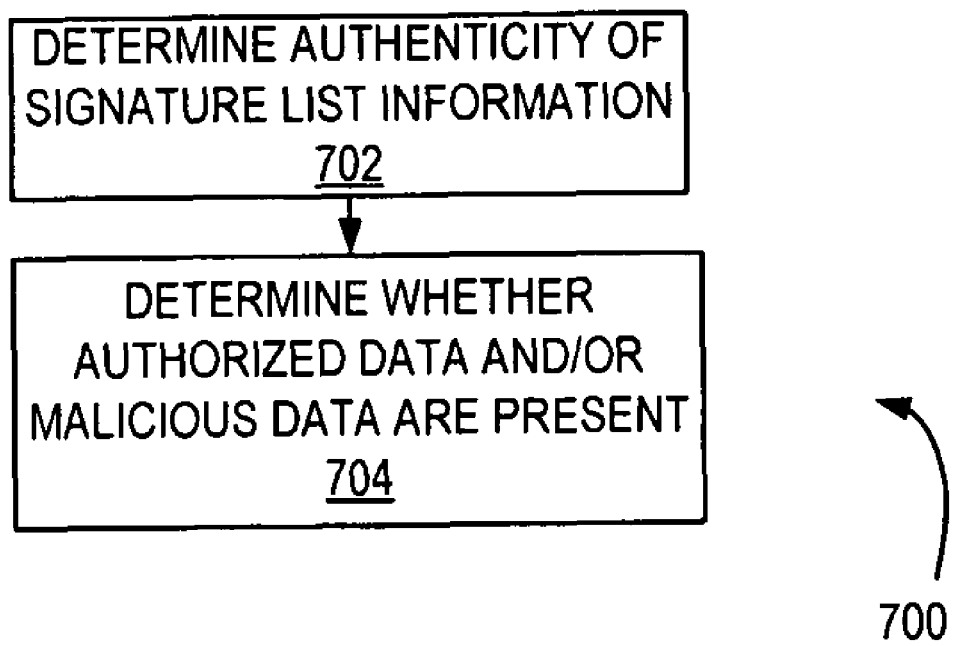
FIG. 7 is a flowchart illustrating operations in an embodiment.

In response, at least in part, to signature list information 60 and/or authentication information 62, circuitry 118 may examine, at least in part, signature list information 60 and/or authentication information 62 to determine the authenticity of signature list information 60 and/or authentication information 62, as illustrated by operation 702 in FIG. 7. In this embodiment, this examination, at least in part, of signature list information 60 and/or authentication information 62, and/or this determination of the authenticity of the signature list information 60 and/or authentication information 62 may be performed by circuitry 118, independently from one or more OS 30 and one or more HP 12 (e.g., out of band with respect to, and without the complicity, involvement, and/or use of one or more OS 30 and one or more HP 12). In this embodiment, authentication information 62 and/or signature list information 60 may comprise, at least in part, one or more cryptographically signed values (e.g., signed using one or more private keys and/or other cryptographic secrets belonging to and/or associated with one or more servers 20) that may be used in one or more cryptographic operations (e.g., one or more asymmetric key cryptographic operations) carried out by circuitry 118 to determine authenticity of signature list information 60 and/or authentication information 62. In this embodiment, circuitry 118 may determine signature list information 60 and/or authentication information 62 to be authentic if, for example, these one or more cryptographic operations result in the determination by circuitry 118 that signature list information 60 and authentication information 62, as received by circuitry 118, was issued by one or more remote servers 20 and that one or more remote servers 20 was authorized to issue signature list information 60 and authentication information 62.

In this embodiment, one or more portions 64 of signature list information 60 may comprise one or more signatures 70. One or more signatures 70 may comprise one or more symbols and/or values, and may be indicative, at least in part, of presence of malicious, undesired, sub-optimal, undesirable, and/or unauthorized data (hereinafter interchangeably collectively and/or singly referred to by the terminology "unauthorized data" and/or "malicious data"). In this embodiment, the indication of the presence of such malicious data may be accomplished by way of positive indicator and/or negative indicator. For example, in one example of the positive indicator case, one or more signatures 70 may be or comprise one or more "black list" signatures whose presence in one or more portions 66 of the contents 65 of memory 21 may positively indicate unauthorized data 68 in the one or more portions 66. Alternatively or additionally, in the negative indicator case, one or more signatures 70 may be or comprise one or more "white list" signatures whose presence in one or more portions 66 of the contents 65 of memory 21 may indicate that unauthorized data 68 is not present in the one or more portions 66. Thus, in the negative indicator case, if the one or more "white list" signatures are not present in the one or more portions 66, this may indicate that unauthorized data 68 may be present in the one or more portions 66. Alternatively or additionally, in another example of a positive indicator case, one or more signatures 70 may comprise one or more "white list" signatures whose presence in one or more portions 66 may indicate that authorized data (AD) 67 may be present in one or more portions 66. In this example, such authorized data 67 may be and/or comprise one or more one or more symbols and/or values that may indicate, at least in part, that one or more portions are authorized, at least in part. For example, in this case, one or more portions 66 may comprise one or more register, boot component, and/or software modules, and the presence of authorized data 67 may indicate, at least in part, that these are "clean" and/or authorized, at least in part.

In this embodiment, such unauthorized data may comprise data and/or one or more program instructions (e.g., undesirable and/or unauthorized virus and/or malicious program data and/or code usable and/or executable, at least in part, by one or more HP 12). For example, in this embodiment, one or more signatures 70 may indicate, at least in part, presence of unauthorized data (e.g., unauthorized data (UD) 68) that may be comprised in one or more portions 66 of the contents 65 of memory 21. Such unauthorized data 68 may be or comprise one or more unauthorized program instructions 72 that may be executable, at least in part, by one or more HP 12. In this embodiment, although not shown in the Figures, the contents 65 of memory 21 may comprise, at least in part, one or more OS 30.

If as a result of operation 702, circuitry 118 determines, based at least in part upon authentication information 62, that signature list information 60 is not authentic, circuitry 118 may signal this determination to one or more servers 20. Circuitry 118 then may cease processing signature list information 60 and/or authentication information 62.

Conversely, if as a result of operation 702, circuitry 118 determines, based at least in part upon authentication information 62, that signature list information 60 is authentic, circuitry 118 and/or CS 32 may store, independently from one or more OS 30 and one or more HP 12), in circuitry 118 (at least in part, and/or at least in part in memory 21 and/or other not shown external flash memory) one or more signature files 121. As stored in circuitry 118 and/or memory 21, one or more signature files 121 may be inaccessible to and hidden from one or more HP 12 and/or one or more OS 30. In this embodiment, one or more signature files 121 may comprise, at least in part, signature list information 60, one or more portions 64 and/or one or more signatures 70.

Circuitry 118 may determine, independently from the one or more OS 30 and the one or more HP 12, based at least in part upon comparison of one or more portions 64 of signature list information 60 with one or more portions 66 of the contents 65 of memory 21, whether unauthorized data 68 and/or authorized data 67 are present in one or more portions 66 of the contents 65 of memory 21. (See operation 704 in FIG. 7). For example, in this embodiment, circuitry 118 may comprise pattern matching circuitry (such as pattern matching circuitry 206 in FIG. 2) and/or one or more state machines (such as for example, state machine 302, 402, 502, and/or 602). Pattern matching circuitry 206 and/or state machine 302, 402, 502, and/or 602 may determine, at least in part, based at least in part upon signature list information 60, one or more portions 64, and/or one or more signatures 70 stored at least in part in one or more signature files 121, whether unauthorized data 68 and/or authorized data 67 are present in one or more portions 66 of the contents 65 of memory 21. Pattern matching circuitry 206 and/or state machine 302, 402, 502, and/or 602 may make this determination independently of the one or more HP 12 and/or one or more OS 30.

Figure 2:
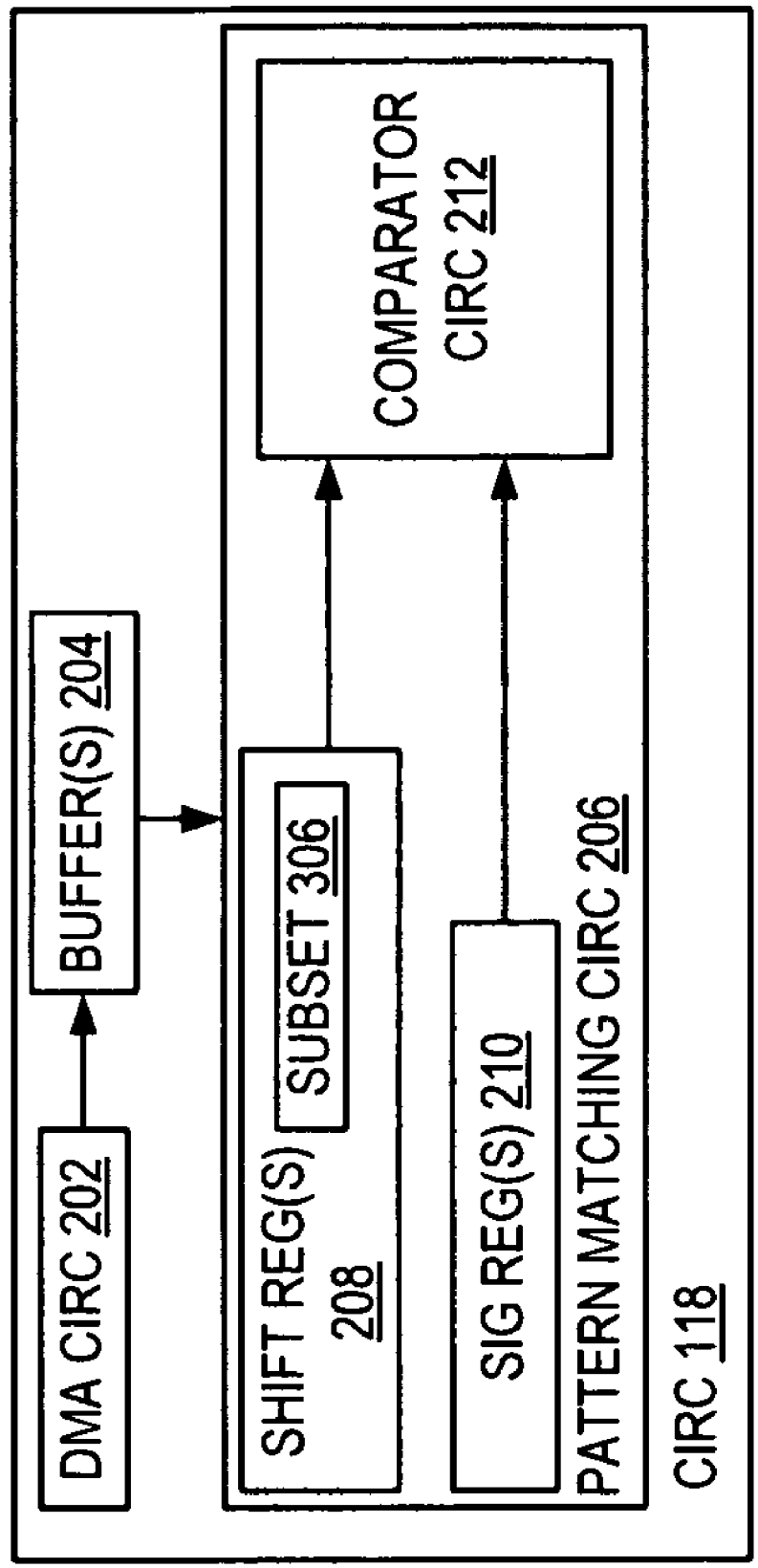
FIG. 2 illustrates circuitry in an embodiment.

For example, with particular reference being made to FIG. 2, in this embodiment, if circuitry 118 comprises pattern matching circuitry 206, circuitry 118 also may comprise direct memory access (DMA) circuitry 202 and one or more buffers 204. Pattern matching circuitry 206 may comprise one or more shift registers 208, one or more signature registers 210, and comparator circuitry 212. Circuitry 118 may store one or more signatures 70, from one or more signature files 121, into one or more signature registers 210. DMA circuitry 202 may retrieve from memory 21 and may store in one or more buffers 204 one or more portions 66 of the contents 65 of the memory 21. In this embodiment, although not shown in the Figures, one or more buffers 204 may include both static random access memory (SRAM) to store relatively larger sized data blocks (e.g., 4 to 16 kilobytes or larger in size) retrieved from the contents 65 of memory 21 by DMA circuitry 202, and staging buffer memory to store relatively smaller sized units (e.g., of a size equal to the size of each of the one or more signatures 70) of the data blocks fetched from the SRAM. These relatively smaller sized units of the data blocks may be passed serially from the staging buffer memory into the one or more shift registers 208, on a byte-by-byte basis, on each system clock transition. Also in this embodiment, on each such clock transition, comparator circuitry 212 may compare each of the one or more signatures 70 stored in the one or more signature registers 210 with the data stored in the one or more shift registers 208.

Thus, in this embodiment, on each such clock transition, one or more shift registers 208 may store a new respective subset 306 of the one or more portions 66 of the contents 65. Each such new respective subset 306 may have a size that is equal to the size of each respective one of the one or more signatures 70. In this embodiment, on each such clock transition, comparator circuitry 212 may receive each such new respective subset 306 and the one or more signatures 70 stored in the one or more shift registers 210, and comparator circuitry 212 may compare each such new respective subset 306 with the one or more signatures 70. Based upon this comparison, the comparator circuitry 212 may determine whether each such new respective subset 306 matches any of the one or more respective signatures 70. If the new respective subset 306 matches any of the one or more respective signatures 70, the comparator circuitry 212 may indicate this, as well as which of the one or more signatures 70 matches the new respective subset 306, to circuitry 118. Also if the new respective subset 306 matches any of the one or more respective signatures 70, shifting of the data through the one or more shift registers 208 may be temporarily halted, and the circuitry 118 may capture and store both a current address in memory 21 at which the new respective subset 306 is located and which of the one or more signatures matched the new respective subset 306. The processing of circuitry 118 may be interrupted to perform circuitry 118 to undertake further processing based upon this captured information. For example, depending upon whether the matching one or more signatures comprise one or more black list signatures, circuitry 118 may determine that unauthorized data 68 is present in the one or more portions 66 of the contents 65 and may undertake appropriate action to eliminate, correct, quarantine, and/or otherwise ameliorate the presence of such unauthorized data 68. Also, for example, depending upon whether the matching one or more signatures comprise one or more white list signatures, circuitry 118 may determine that authorized data 67 associated with the one or more matching signatures may be present in the one or more portions 66 of the contents 65. Conversely, if one or more signatures 70 comprise one or more such white list signatures, and no match for the one or more white list signatures in any new respective subset 306 from the one or more portions 66 of the contents 65, circuitry 118 may determine that unauthorized data 68 may be present in the one or more portions 66 and/or that authorized data 67 may not be present in one or more portions 67.

As data is fetched out of the SRAM, DMA circuitry 202 may retrieve additional blocks from the one or more portions 66 of the contents 65, as necessary to permit one or more additional respective subsets of data from the one or more portions 66 to continue to be fed into the staging buffer memory and thence into the one or more shift registers 208, without interruption, until all of the one or more portions 66 has been retrieved from memory 21 by DMA circuitry 202. Thus, eventually, as a result of this process, the one or more portions 66 of the contents 65 are stored (e.g., in the form of a series of one or more respective subsets 306 of the one or more portions 66) in the one or more buffers 204 and one or more shift registers 208, and are compared (e.g., also in the form of a series of one or more respective subsets 306 of the one or more portions 66) by the comparator circuitry 212 with the one or more signatures 70 stored in the one or more signatures registers 210.

Although not shown in the Figures, the comparator circuitry 212 may comprise several pipeline stages comprising exclusive-or (XOR), not-or (NOR), and/or other logic circuitry to perform the comparisons and to consolidate and/or translate the results of such comparisons into a format appropriate for use by circuitry 118. Additionally, if one or more signatures 70 comprise a plurality of signatures that have respective sizes that differ, at least in part, from each other, subset 306 may comprise a plurality of subsets having respective sizes in accordance with the respective sizes of the plurality of signatures.

Figure 3:
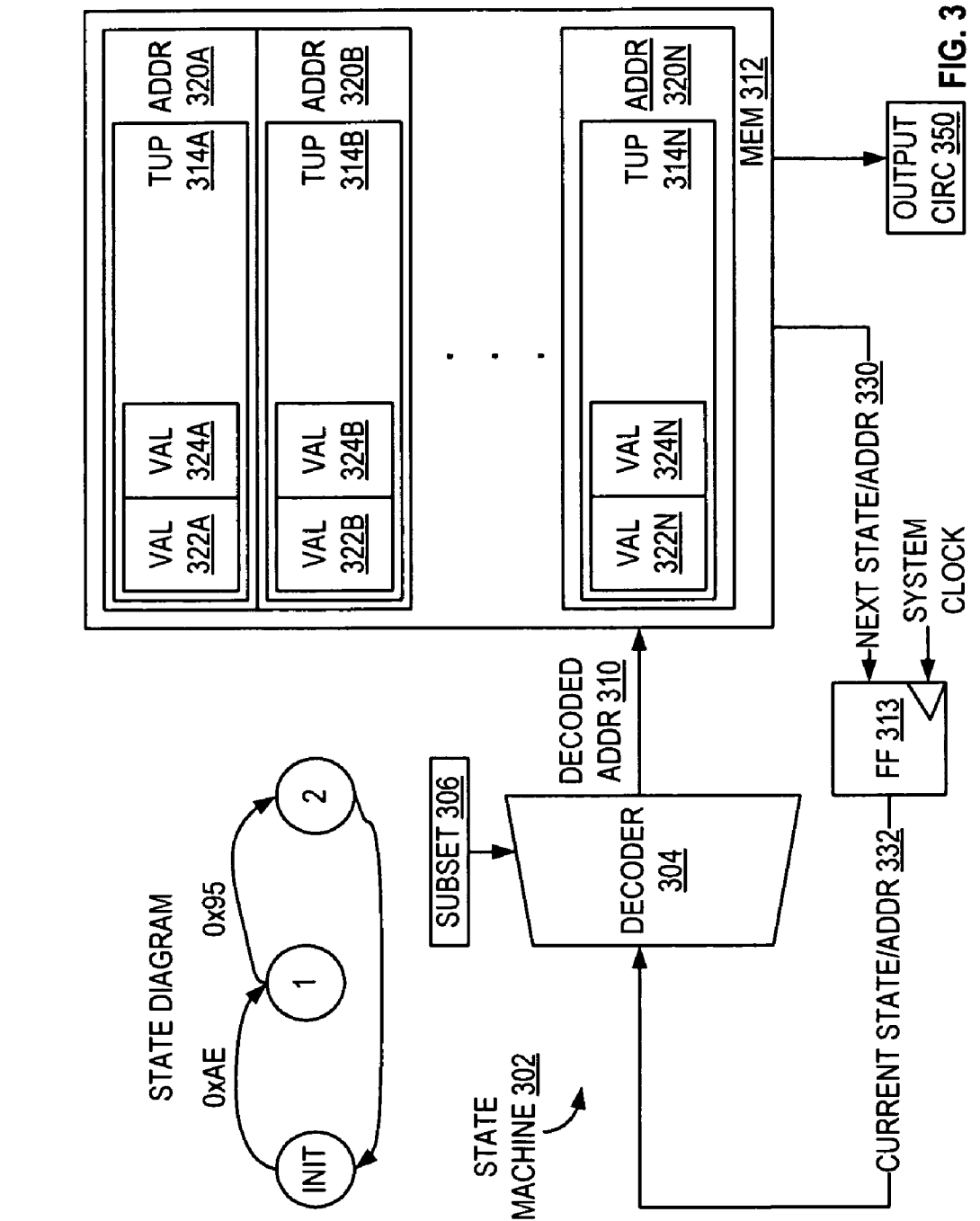
FIG. 3 illustrates circuitry and exemplary state diagram in an embodiment.

With particular reference being made to FIG. 3, a finite state machine 302 that may be comprised in circuitry 118 in an embodiment will now be described. In this embodiment, state machine 302 may comprise memory 312, decoder 304, flip-flop (FF) 313, and output circuitry 350. Memory 312 may store tuples 314A . . . 314N at respective address locations 320A . . . 320N in memory 312. Each of the tuples 314A . . . 314N may comprise respective first values 322A . . . 322N and respective second values 324A . . . 324N. In this embodiment, each of the respective first values 322A . . . 322N may comprise a respective 12-bit value that may indicate a respective possible next state of the state machine 302. In this embodiment, each of the respective second values 324A . . . 324N may comprise a respective 7-bit value that may indicate whether one or more portions 66 of the contents 65 matches one or more of the one or more signatures 70 (and therefore, also comprises unauthorized data 68). If a respective one of the second values 324A . . . 324N indicates that one or more portions 66 of the contents 65 matches one or more of the one or more signatures 70, the respective one of the second values 324A . . . 324N may also indicate which of the one or more signatures 70 matches the one or more portions 66 of the contents 65.

In this embodiment, in operation, decoder 304 may generate, based at least in part, upon the current respective subset 306 of the one or more portions 66 of the contents 65 and a current state (as represented by current state/address information 332) of the state machine 302, a decoded address 310 to be provided to the memory 312. More specifically, in this embodiment, current state/address information 332 may be 12-bits in size, and as stated previously, respective subset 306 may be one byte in size. Decoder 304 may append subset 306 to the least significant bit of current state/address information 332, and the resulting 20-bit concatenation may form the decoded address 310 that is generated and output by decoder 304 to memory 312.

Memory 312 may select one or more respective addresses (e.g., address 320A) addressed by decoded address 310. Circuitry 118 may examine the respective second value (in this example, second value 324A) in the respective tuple 314A stored at these one or more respective addresses 320A to determine whether the respective second value 324A indicates that one or more portions 66 of the contents 65 matches one or more of the one or more signatures 70. If second value 324A does indicate that such a match exists, output circuitry 350 may output to circuitry 118 one or more signals that may indicate which of the one or more signatures 70 matches the one or more portions 66 of the contents 65. Circuitry 118 may then undertake appropriate processing (e.g., of the type previously described). Conversely, if second value 324A does not indicate such a match, output circuitry 350 may indicate to circuitry 118 that no such match has presently been found.

In either case, memory 312 may indicate the next state to be assumed by the state machine 302 in the next succeeding system clock transition, by providing as an input to FF 313, next state/address information 330. In this embodiment, next state/address information 330 may be the respective first value 322A in the tuple 314A at the one or more respective addresses 320A addressed by decoded address 310. When the next succeeding system clock transition occurs, FF 313 may output, as the current state/address information 332, the present next state/address information 330, and decoder 304 may combine this new information 332 with a next succeeding subset 306 to produce (in the manner described previously) a new decoded address 310 to be supplied to memory 312. The above-described processing of state machine 302 may repeat for any desired number of iterations.

For purposes of illustrating the operation of state machine 302, let us assume that state machine 302 commences its operation in an initial state (INIT), the current value of respective subset 306 is 0xAE (i.e., AE hexadecimal), and one or more signatures 70 comprises a relatively simple two byte signature: 0xAE95. In this initial state, the current state/address information 332 may be selected such that the decoded address 310 generated by decoder 304 (from information 332 and respective subset 306) addresses one or more respective addresses 320B which store tuple 314B that is associated with a first state (labeled "1" in the state diagram in FIG. 3). As a result, circuitry 118 examines second value 324B in tuple 314B, which indicates that a match with one or more signatures 70 has not yet been found to exist in one or more portions 66. Memory 312 therefore outputs, as next state/address information 330, first value 322B. At the next system clock transition, FF 313 outputs first value 322B as the current state/address information 332, and (for purposes of this example) respective subset 306 changes to the value, 0x95. In this example, first value 322B has been predetermined such that if the respective subset 306 combined with it by decoder 304 is equal to the last half of the signature 0xAE95 (i.e., 0x95), the resultant decoded address 310 will address one or more addresses 320N that store tuple 314N that is associated with a second state (labeled "2" in the state diagram of FIG. 3). Thus, in this example, first value 322B indicates that the next state of the state machine 302 is to be the second state (depending upon the particular value of the subset 306 after the next system clock transition). In the tuple 314N stored at one or more addresses 320N, the second value 324N has been predetermined to indicate that a match has been found in one or more portions 66 with signature 0xAE95 of one or more signatures 70, and first value 322N has also been predetermined to return the state machine to its initial state (INIT). Thus, in this example, first value 322N indicates that the next state of the state machine 302 is to be the initial state. Output circuitry 350 provides one or more signals to circuitry 118 that indicate this information indicated by second value 324N, and memory 312 outputs the first value 322N as next state/address information 330. Conversely, in this example, the first value 322B has also been predetermined such that if the respective subset 306 combined with it by decoder 304 is not equal to the last half of the signature 0xAE95, the resultant decoded address 310 will address one or more addresses (e.g., one or more addresses 320A) storing a tuple 314A associated with the initial state. For purposes of this example, this assumes, of course, that the combination of the present value of subset 306 with the previous series of values of the subset 306 at preceding system clock transitions does not match any of the one or more signatures 70.

In this embodiment, the information 71 that may be comprised in tuples 314A . . . 314N, and/or tuples 314A . . . 314N themselves may be received, at least in part, by circuitry 118 from one or more servers 20 (e.g., as part of one or more portions 64 of signature list information 60). Circuitry 118 may store, independently from one or more OS 30 and one or more HP 12, in memory 312, the received tuple information 71 and/or tuples 314A . . . 314N. Alternatively or additionally, without departing from this embodiment, some or all of the tuple information 71 and/or the tuples 314A . . . 314N themselves may be provided to one or more hosts 10 via one or more other and/or additional instrumentalities (e.g., preprogrammed into circuitry 118, downloaded from one or more other and/or additional secure and/or authenticated sources, manual entry, etc.). As stored in memory 312, tuples 314A . . . 314N may be inaccessible to and hidden from one or more HP 12 and/or one or more OS 30.

Figure 4:
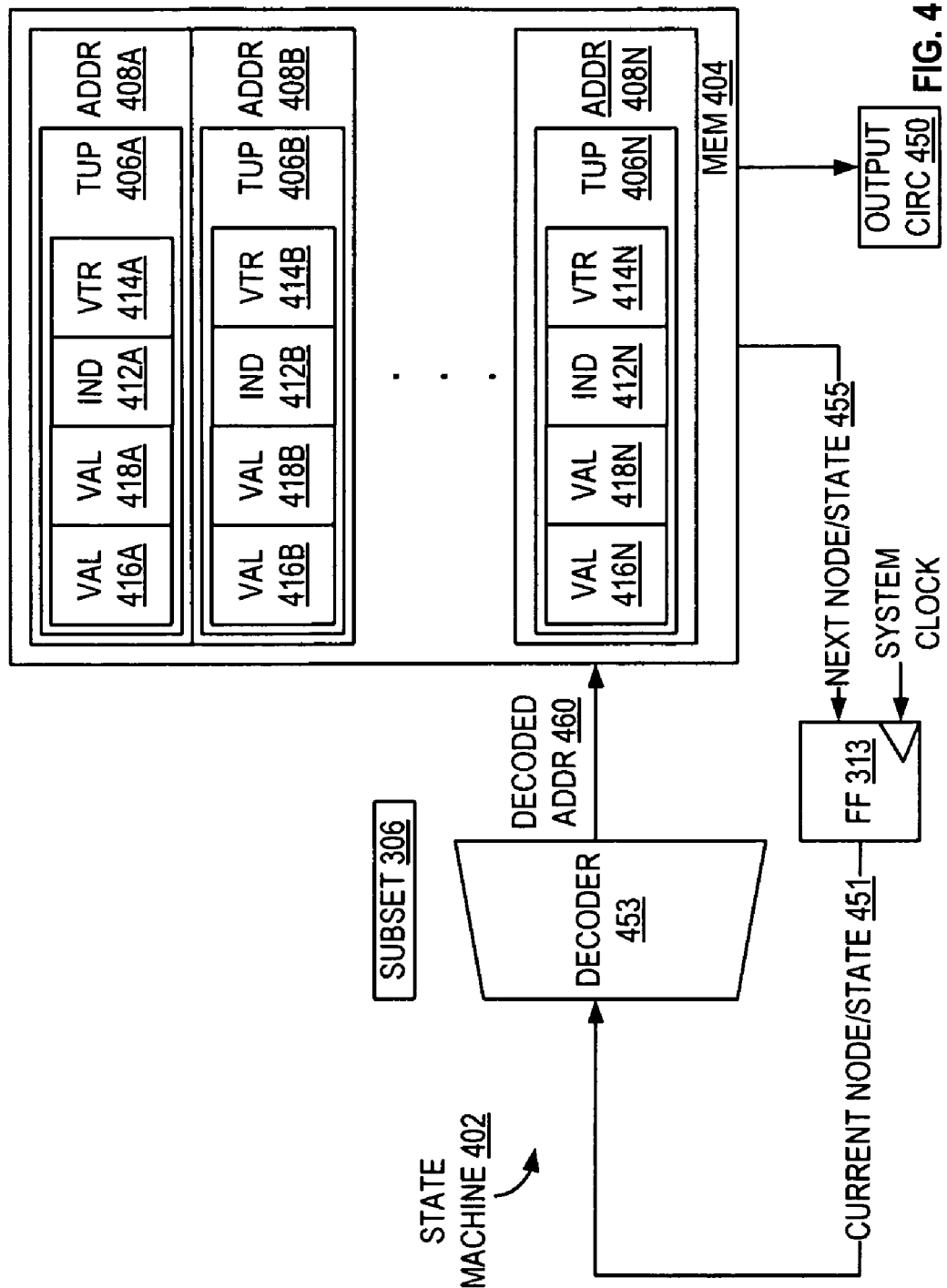
FIG. 4 illustrates circuitry in an embodiment.

With particular reference being made to FIG. 4, another finite state machine 402 that may be comprised in circuitry 118 in an embodiment will now be described. In this embodiment, state machine 402 may comprise memory 404, decoder 453, FF 313, current node/state information 451, next node/state information 455, and output circuitry 450. Memory 404 may store tuples 406A . . . 406N at respective address locations 408A . . . 408N in memory 404. Tuples 404A . . . 404N may comprise respective values 416A . . . 416N, respective values 418A . . . 418N, respective indicators 412A . . . 412N, and respective match vectors 414A . . . 414N. Values 416A . . . 416N may be or comprise possible values of subset 306. Each respective indicator 412A . . . 412N in respective tuples 406A . . . 406N may indicate whether another respective tuple (i.e., other than the respective tuple that comprises the respective indicator) may be associated with a respective possible current state of the state machine that is also associated with the respective tuple that comprises the respective indicator.

In this embodiment, unless stated to the contrary herein, the respective functions of memory 404, decoder 453, FF 313, current node/state information 451, next node/state information 455, and output circuitry 450 in state machine 402 may be substantially similar to the respective functions of memory 312, decoder 304, FF 313, current state/address information 332, next state/address information 330, and output circuitry 350, respectively, in state machine 302. Likewise, unless stated to the contrary herein, the function of next address values 418A . . . 418N in state machine 402 may be substantially similar to the function of first values 322A . . . 322N in state machine 302. Additionally, the function of match vectors 414A . . . 414N in state machine 402 may be substantially similar to the function of second values 324A . . . 324N in state machine 302.

Thus, for example, in state machine 402, each of the respective vectors 414A . . . 414N may indicate whether one or more portions 66 of the contents 65 matches one or more of the one or more signatures 70. If a respective one of the vectors 414A . . . 414N indicates that one or more portions 66 of the contents 65 matches one or more of the one or more signatures 70, the respective one of the vectors 414A . . . 414N may also indicate which of the one or more signatures 70 matches the one or more portions 66 of the contents 65. Output circuitry 450 may provide one or more signals to circuitry 118 based upon vectors 414A . . . 414N in substantially the same manner (described previously) that output circuitry 350 may provide one or more signals to circuitry 118 based upon values 324A . . . 324N.

However, in state machine 402, decoder 453 may generate decoded address 460 based solely upon (e.g., equal to) the current node state information 451 (instead of also basing it upon subset 306). Advantageously, this may permit the address bus width and memory size of memory 404 in state machine 402 to be reduced compared to the width and memory size of memory 312 in state machine 302. In this embodiment, circuitry 118 may initially select for examination the tuple (e.g., tuple 406A) stored at the address (e.g., address 408A) addressed by decoded address 460. Circuitry 118 may compare the respective possible subset value (e.g., 416A) in that tuple 406A with the actual current value of subset 306. If these two values match, memory 404 may output, as the next node/state information 455, the respective next address value 418A in the initially selected tuple 406A, thereby selecting, as the actual next state of the state machine 402, the possible next state associated with both the value 418A and the tuple (e.g., tuple 406N) addressed by the address value 418A.

Conversely, if the value 416A does not match the actual current value of subset 306, circuitry 118 may examine the respective indicator value (e.g., 412A) in the initially selected tuple 406A. If the respective indicator value 412A is equal to a first predetermined value (e.g., 0), this may indicate that this is the only tuple in memory 404 that is associated with the current state of the state machine 402. Therefore, since the subset 306 does not match value 416A (and also therefore is not associated with tuple 406A), memory 404 may output, as next node/state information 455, a value that will result in state machine 402 entering its initial state when that value becomes the current node/state information 451.

Conversely, if the respective indicator value 412A is equal to a second predetermined value (e.g., 1), this may indicate that there is at least one other tuple (e.g., the tuple at the next succeeding address in memory 404, such as tuple 406B) that is associated with the same respective current state of the state machine 402 with which the tuple 406A is associated. In this case, the circuitry 118 may examine the tuple 406B at the next succeeding address 408B to determine whether the respective possible subset value 416B matches the actual current subset value 306. If these two values do not match, circuitry 118 may examine the respective indicator 412B. If the respective indicator 412B is equal to a third predetermined value (e.g., 10), this may indicate that this is the last tuple that is associated with the current respective state of the state machine 402, and memory 404 may output, as next node/state information 455, a value that will result in state machine 402 entering its initial state when that value becomes the current node/state information 451. Conversely, if the respective indicator 412B is equal to one of other two predetermined values 0 or 1, circuitry 118 and memory 404 may act in the manner described above in connection with these predetermined values (e.g., outputting the initial state value as the next node/state information 455, or examine the next succeeding tuple, respectively). The above-described processing of state machine 402 may repeat for any desired number of iterations.

In this embodiment, the decoded address 460 in state machine 402 may be 12 bits in size, in contrast to decoded address 310 in state machine 302. Advantageously, this may permit memory 404 in state machine 402 to be substantially reduced in size (despite the fact that memory 404 may store values 416A . . . 416N and indicators 412A . . . 412N, but memory 312 may not) compared to memory 312 in state machine 302.

Figure 5:
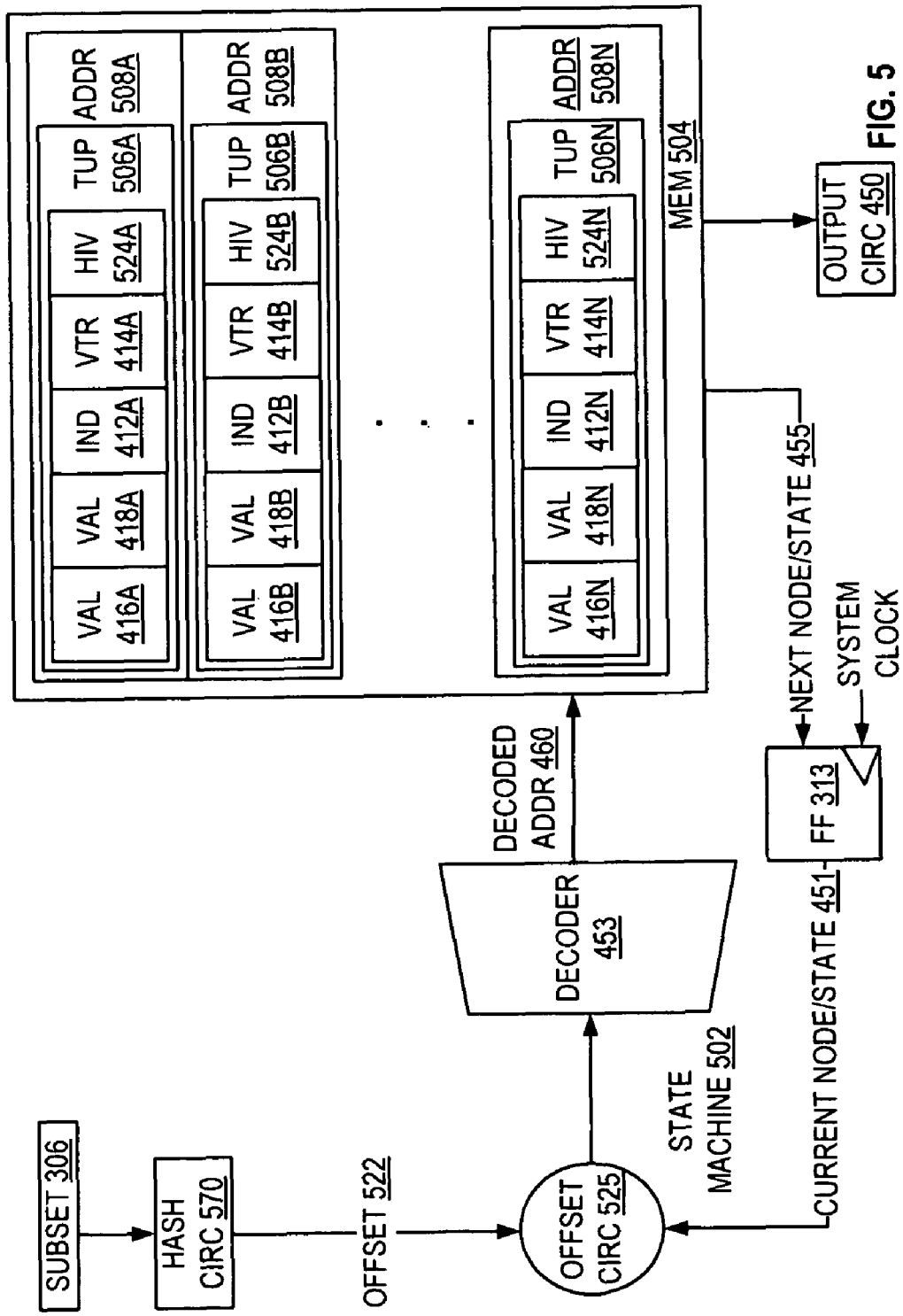
FIG. 5 illustrates circuitry in an embodiment.

With particular reference being made to FIG. 5, another finite state machine 502 that may be comprised in circuitry 118 in an embodiment will now be described. In this embodiment, state machine 502 may comprise memory 504, offset circuitry 525, decoder 453, FF 313, current node/state information 451, next node/state information 455, hash circuitry 570, and output circuitry 450. Memory 504 may store tuples 506A . . . 506N at respective address locations 508A . . . 508N in memory 404. Tuples 506A . . . 506N may comprise respective values 416A . . . 416N, respective values 418A . . . 418N, respective indicators 412A . . . 412N, and respective match vectors 414A . . . 414N, whose respective functions may be substantially the same as their counterparts in state machine 402 in FIG. 4. Additionally, tuples 418A . . . 418N may comprise hash function input values 524A . . . 524N.

In this embodiment, unless stated to the contrary herein, the respective functions of memory 504, decoder 453, FF 313, current node/state information 451, next node/state information 455, and output circuitry 450 in state machine 502 may be substantially similar to the respective functions of memory circuitry 404, decoder 453, FF 313, current node/state information 451, next node/state information 455, and output circuitry 450 in state machine 402. However, state machine 502 includes hash input values 524A . . . 524N that indicate whether to perform a hashing, using hash circuitry 570, involving subset 306, to generate an offset (e.g., of 3 bits) 522 to be applied (e.g., added), by offset circuitry 525, to the current node/state information 451 prior to providing information 451 to decoder 453. Advantageously, by including these features in state machine 502, the throughput performance of the state machine 502 may be improved compared to that of state machine 402, without increasing the area consumed by state machine 502 to an extent that is undesirable. This may result, at least in part, because, as is discussed below, in state machine 502, offset 522 may be used (at least in part) in selecting an appropriate tuple, instead of, as may be the case in state machine 402, making such selection based (at least in part) upon comparing the actual respective subset 306 with one or more of the respective values 416A . . . 416N. In this embodiment, if a respective one (e.g., 524A) of the hash input values 524A . . . 524N indicates that the hashing is to be performed, the respective hash input value 524A also may comprise another value to be used by the hash circuitry 570 to calculate the offset 522 to be input to the offset circuitry 525. This other value (V), as well as, the hash function implemented by the hash circuitry 570 may be empirically determined to randomize hash mapping so as to randomize possibility of collision in selecting addresses within respective sets of tuples associated with respective states of the state machine 502. For example, hash circuitry 570 may calculate the offset 522 by performing a vector multiplication of the respective bits of the subset 306 with respective bits randomly chosen from a matrix that includes zero and $2^V-1$. In the event that the hashing function results in address collision, decoder 453 may output the decoded address 460 based upon, for example, a linear or quadratic probe algorithm.

Figure 6:
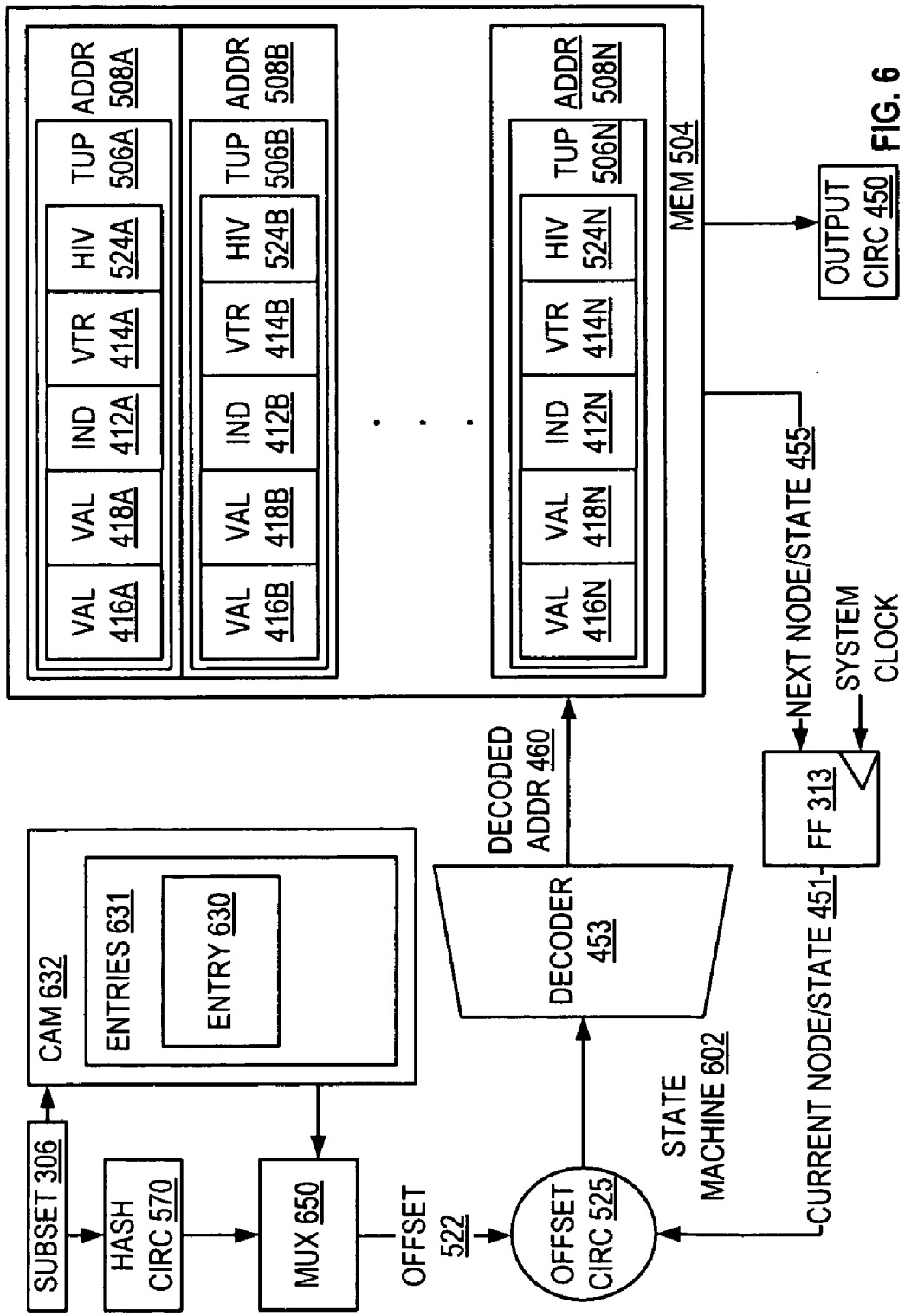
FIG. 6 illustrates circuitry in an embodiment.

With particular reference being made to FIG. 6, another finite state machine 602 that may be comprised in circuitry 118 in an embodiment will now be described. In this embodiment, state machine 602 may comprise memory 504, offset circuitry 525, decoder 453, FF 313, current node/state information 451, next node/state information 455, hash circuitry 570, content addressable memory (CAM) 632, and output circuitry 450. Memory 504 may store tuples 506A . . . 506N at respective address locations 508A . . . 508N in memory 404.

In this embodiment, unless stated to the contrary herein, the respective function and operation of state machine 602 may be substantially similar to the respective function and operation of state machine 502. However, state machine 602 includes CAM 632 that stores entries 630 corresponding to possible values of subset 306. Entries 630 store respective offsets that are to be applied by offset circuitry 525, depending upon the actual current value of subset 306, when state machine 602 is in an initial state, to result in the decoded address 460 selecting (e.g., addressing) the respective tuple in memory 504 that is associated with the initial state of state machine 602 and whose respective first value matches the actual current value of subset 306.

By way of example, during the initial state of state machine 602, the actual current value of subset 306 may correspond to entry 630 in CAM 632, and CAM 632 may output the offset stored in entry 630 to multiplexer 650. During the initial state of state machine 602, multiplexer 650 may output, as offset 522, to offset circuitry 525 the offset output to multiplexer 650 from CAM 632. Conversely, when state machine 602 is not in the initial state, multiplexer 650 may output, as offset 522, the output of hash circuitry 570. Given that it is likely that in actual implementation of state machine 602, the fan-out from the initial state will be relatively large, by utilizing CAM 632, state machine 602 may exhibit improved performance and surface area consumption compared to state machine 502.

In this embodiment, circuitry 118, pattern matching circuitry 206, and/or state machine 302, 402, 502, and/or 602 may be capable of executing the operations described herein as being performed by circuitry 118, pattern matching circuitry 206, and/or state machine 302, 402, 502, and/or 602, independently of one or more OS 30 and the power state or condition of one or more HP 12. Thus, for example, circuitry 118, pattern matching circuitry 206, and/or state machine 302, 402, 502, and/or 602 may be capable of performing these operations regardless of whether the one or more OS 30 and/or one or more HP 12 are operational and/or in a fully powered-on state. Advantageously, this may permit circuitry 118, pattern matching circuitry 206, and/or state machine 302, 402, 502, and/or 602 in this embodiment to operate in the manner described herein, regardless of whether the one or more OS 30 and/or HP 12 are operating properly. Also advantageously, this may permit circuitry 118, pattern matching circuitry 206, and/or state machine 302, 402, 502, and/or 602 in this embodiment to operate as described above even when the one or more HP 12 are in a relatively lower power state such, as for example, a powered-down, sleep, or hibernation state, relative to a fully powered-on state of the one or more HP 12, thereby permitting this embodiment to consume less power in carrying out such operations.

Also in this embodiment, communication between the circuitry 118 and the server 20 may be carried out in accordance with secure hardware-based authentication techniques (e.g., in accordance with Intel® AMT hardware authentication and out-of-band communication channels). Advantageously, this may permit this embodiment to exhibit improved, hardened authentication and security properties.

Thus, an embodiment may include circuitry that may be comprised in a host. The host may include memory and a host processor to execute an operating system. The circuitry may be to determine, independently of the operating system and the host processor, the authenticity of signature list information, based at least in part upon authentication information received by the circuitry from a remote server. The circuitry also may be to determine, independently of the operating system and the host processor, based at least in part upon comparison of at least one portion of the signature list information with at least one portion of contents of the memory, whether authorized data and/or malicious data is present in the at least one portion of the contents of the memory.

In addition to the other advantages of this embodiment, the above operations of circuitry 118 do not rely upon agent software processes and/or one or more operating systems 30 executed by the host processor. This may make it more difficult for circuitry 118 to be tampered with and/or its operations co-opted by malicious programs (e.g., viruses). Also, this may reduce the amount of the host processor's processing bandwidth, as well as, the amount of processing time consumed this embodiment. Additionally, since the operations of circuitry 118 may be carried out essentially entirely by hardware, this also may increase the speed with which circuitry 118 is capable of carrying out such operations.

Of course, the respective bit sizes, contents, functions, and/or configurations of the components of state machines 302, 402, 502, and/or 602 (e.g., of subset 306, current state/address information, next state/address information, decoded address, memory, CAM (and/or entries therein), contents of and/or values in the tuples, etc.) may vary without departing from this embodiment.

What is claimed is:

1. An apparatus comprising:
circuitry to be comprised in a host, the host including a host processor and memory, the host processor being to execute an operating system, the circuitry being to determine, independently of the operating system and the host processor, authenticity of signature list information, the circuitry being to determine the authenticity based at least in part upon authentication information received by the circuitry from a remote server, the circuitry also being to determine, independently of the operating system and the host processor, based at least in part upon comparison of at least one portion of the signature list information with at least one portion of contents of the memory, whether at least one of authorized data and malicious data is present in the at least one portion of the contents of the memory, the circuitry comprising a finite state machine, the finite state machine comprising a flip-flop to receive, during a clock transition, next state information that is to be supplied to a decoder during a succeeding clock transition as current state information, the finite state machine comprising the decoder, the next state information representing a next state of the finite state machine, the current state information representing a current state of the finite state machine.

2. The apparatus of claim 1, wherein:
the at least one portion of the signature list information includes one or more signatures;
the malicious data comprises at least one unauthorized program instruction executable by the host processor;
the authorized data indicates, at least in part, that the at least one portion is authorized, at least in part; and
the signature list information is received, at least in part, from the remote server by the circuitry, independently of the host processor and the operating system.

3. The apparatus of claim 1, wherein:
a circuit board comprises the host processor;
a circuit card comprises, at least in part, the circuitry; and
the circuit card is to be coupled to the circuit board.

4. The apparatus of claim 1, wherein:
the at least one portion of the signature list information includes one or more signatures;
the circuitry comprises memory access circuitry, one or more buffers, and pattern matching circuitry;
the memory access circuitry is to retrieve from the memory and to store in the one or more buffers the at least one portion of the contents of the memory; and
the pattern matching circuitry comprises:
one or more shift registers to receive from the one or more buffers the at least one portion of the contents of the memory;
one or more signature registers to store the one or more signatures; and
comparator circuitry to receive from the one or more shift registers the at least one portion of the contents of the memory and to compare with the at least one portion of the contents of the memory the one or more signatures stored in the one or more signatures registers.

5. The apparatus of claim 1, wherein:
the at least one portion of the signature list information includes one or more signatures;
the decoder is to generate, based at least in part upon a subset of the at least one portion of the contents of the memory and the current state information, a decoded address; and
the finite state machine includes:
another memory to store tuples at address locations and to select one of the tuples addressed by the decoded address, the one of the tuples including a first value and a second value, the first value indicating the next state information, the second value indicating whether the at least one portion of contents matches the one or more signatures, and if the second value indicates that the at least one portion of the contents matches the one or more signatures, the second value also indicates which of the one or more signatures matches the at least one portion of the contents.

6. The apparatus of claim 1, wherein:
the at least one portion of the signature list information includes one or more signatures;
the state machine includes:
another memory to store tuples at addresses in the another memory, the tuples being associated with possible current states of the state machine, each respective one of the tuples including:

one or more respective addresses in the another memory that store another respective tuple that is associated with a respective possible next state of the state machine;

a respective indicator to indicate whether yet another respective tuple stored in the another memory is associated with a respective possible current state of the state machine that is associated with the respective one of the tuples;

a respective vector indicating whether the at least one portion of contents matches the one or more signatures, and if the respective vector indicates that the at least one portion of the contents matches the one or more signatures, the respective vector also indicates which of the one or more signatures matches the at least one portion of the contents; and a respective possible value of a subset of the at least one portion of the contents, the respective possible value to be compared to a respective actual value of the subset to determine whether to select the respective possible next state as an actual next state of the state machine.

7. The apparatus of claim 6, wherein:
the apparatus is to select a selected address in the another memory that is associated with a current selected one of the tuples, the current selected one of the tuples being associated with an actual current state of the state machine; and
the apparatus is to generate the selected address based at least in part upon an offset, the offset being based at least in part upon a hashing of the subset.

8. The apparatus of claim 6, wherein:
the apparatus is to select a selected address in the another memory that is associated with a current selected one of the tuples, the current selected one of the tuples being associated with an actual current state of the state machine; and
if the actual current state of the state machine is an initial state, the apparatus is to generate the selected address based at least in part upon an offset, the offset being based at least in part upon an entry in a content addressable memory accessed based at least in part upon the subset.

9. The apparatus of claim 1, wherein:
the circuitry is at least one of:
comprised at least in part in at least one chipset;
comprised in a co-processor separate from the host processor; and
comprised in a manageability co-processor separate from the host processor.

10. A method comprising:
determining by circuitry, independently of a host processor and an operating system, authenticity of signature list information, the circuitry to be comprised in a host, the host including the host processor and memory, the host processor being to execute the operating system, the circuitry determining the authenticity based at least in part upon authentication information received by the circuitry from a remote server; and
determining by the circuitry, independently of the operating system and the host processor, based at least in part upon comparison of at least one portion of the signature list information with at least one portion of contents of the memory, whether at least one of authorized data and malicious data is present in the at least one portion of the contents of the memory, the circuitry comprising a finite state machine, the finite state machine comprising a flip-flop to receive, during a clock transition, next state information that is to be supplied to a decoder during a succeeding clock transition as current state information, the finite state machine comprising the decoder, the next state information representing a next state of the finite state machine, the current state information representing a current state of the finite state machine.

11. The method of claim 10, wherein:
the at least one portion of the signature list information includes one or more signatures;
the malicious data comprises at least one unauthorized program instruction executable by the host processor;
the authorized data indicates, at least in part, that the at least one portion is authorized at least in part; and
the signature list information is received, at least in part, from the remote server by the circuitry, independently of the host processor and the operating system.

12. The method of claim 10, wherein:
at least one of the determining of the authenticity of the signature list information and the determining whether the at least one of the authorized data and the malicious data is present is carried out by the circuitry at least in part while the host processor is in a relatively lower power state relative to a fully powered-on state.

13. The method of claim of claim 10, wherein:
the circuitry comprises pattern matching circuitry, the pattern matching circuitry being to determine, at least in part, whether the at least one of the authorized data and the malicious data is present.

14. The method of claim 10, wherein:
the circuitry is at least one of:
comprised at least in part in at least one chipset;
comprised in a co-processor separate from the host processor; and
comprised in a manageability co-processor separate from the host processor.

15. Computer-readable memory storing one or more instructions that when executed by a machine result in execution of a set of operations comprising:
determining by circuitry, independently of a host processor and an operating system, authenticity of signature list information, the circuitry to be comprised in a host, the host including the host processor and memory, the host processor being to execute the operating system, the circuitry determining the authenticity based at least in part upon authentication information received by the circuitry from a remote server; and
determining by the circuitry, independently of the operating system and the host processor, based at least in part upon comparison of at least one portion of the signature list information with at least one portion of contents of the memory, whether at least one of authorized data and malicious data is present in the at least one portion of the contents of the memory, the circuitry comprising a finite state machine, the finite state machine comprising a flip-flop to receive, during a clock transition, next state information that is to be supplied to a decoder during a succeeding clock transition as current state information, the finite state machine comprising the decoder, the next state information representing a next state of the finite state machine, the current state information representing a current state of the finite state machine.

16. The computer-readable memory of claim 15, wherein:
the at least one portion of the signature list information includes one or more signatures;
the malicious data comprises at least one unauthorized program instruction executable by the host processor;

the authorized data indicates, at least in part, that the at least one portion is authorized at least in part; and the signature list information is received, at least in part, from the remote server by the circuitry, independently of the host processor and the operating system.

17. The computer-readable memory of claim 15, wherein:
at least one of the determining of the authenticity of the signature list information and the determining whether the at least one of the authorized data and the malicious data is present is carried out by the circuitry at least in part while the host processor is in a relatively lower power state relative to a fully powered-on state.

18. The computer-readable memory of claim 15, wherein:
the circuitry comprises pattern matching circuitry, the pattern matching circuitry being to determine, at least in part, whether the at least one of the authorized data and the malicious data is present.

19. The computer-readable memory of claim 18, wherein:
the malicious data comprises one or more other instructions executable by the host processor.

20. The computer-readable memory of claim 15, wherein:
the circuitry is at least one of:
  comprised at least in part in at least one chipset;
  comprised in a co-processor separate from the host processor; and
  comprised in a manageability co-processor separate from the host processor.

* * * * *

UNITED STATES PATENT AND TRADEMARK OFFICE
CERTIFICATE OF CORRECTION

PATENT NO. : 8,214,902 B2  
APPLICATION NO. : 12/487878  
DATED : July 3, 2012  
INVENTOR(S) : Hormuzd M. Khosravi et al.

Page 1 of 1

It is certified that error appears in the above-identified patent and that said Letters Patent is hereby corrected as shown below:

In column 16, line 25, in claim 13, delete "of claim of claim" and insert -- of claim --, therefor.

Signed and Sealed this
Eleventh Day of September, 2012

David J. Kappos
*Director of the United States Patent and Trademark Office*